United States Patent [19]

Pease et al.

[11] Patent Number: 4,490,607
[45] Date of Patent: Dec. 25, 1984

[54] PINHOLE OBJECTIVE FIBRE OPTIC LIGHT PEN

[75] Inventors: Logan L. Pease; Wes F. Carmean, both of Reno, Nev.

[73] Assignee: IGT, Reno, Nev.

[21] Appl. No.: 400,796

[22] Filed: Jul. 22, 1982

[51] Int. Cl.³ .............................................. G09F 9/00
[52] U.S. Cl. .................................... 250/227; 340/707
[58] Field of Search ............... 250/227, 229; 340/707, 340/365 P; 235/472, 473

[56] References Cited

U.S. PATENT DOCUMENTS

| | | | |
|---|---|---|---|
| 3,749,932 | 7/1973 | Jones | 250/227 |
| 4,107,540 | 8/1978 | Hillman | 235/472 |
| 4,109,146 | 8/1978 | Hillman | 250/227 |

FOREIGN PATENT DOCUMENTS 1138235 12/1982 Canada ................................ 340/707

Primary Examiner—David C. Nelms
Assistant Examiner—J. J. Brophy
Attorney, Agent, or Firm—Townsend and Townsend

[57] ABSTRACT

A light pen is described wherein light information indicative of a selected position on a lighted display is propagated along a light conductive fibre cable to a processing circuit. The light pen includes a retractable sleeve wherein pressing the pen to the lighted display moves a pin-hole objective to its focal point on a light conductive fibre cable such that light entering through the pin-hole objective from the lighted display may be propagated along the light conductive fibre cable. Additionally, a magnet may be secured to the sleeve such that the magnet is brought into proximity to, and operates a magnet-actuated switch when the sleeve is retracted.

9 Claims, 5 Drawing Figures

PINHOLE OBJECTIVE FIBRE OPTIC LIGHT PEN

BACKGROUND OF THE INVENTION

1. Field of the Invention

The present invention relates to light pens. More particularly, the present invention relates to a light pen where light from a light source is propagated along a light conductive fibre cable to a light receiving and processing station.

2. Description of the Prior Art

It is known to use a pen shaped implement to detect the position of an image on a lighted display such as a Cathode Ray Tube or plasma panel. Typical light pen devices include a light responsive element in the pen tip. When the pen tip is placed to the lighted display, the light responsive element produces a signal that identifies the position of the image selected.

Most improvements in light pens have been directed to the light receiver or light responsive element. For example, various types of photodiodes have been employed as light receptive elements. Additionally, switches have been incorporated into the light pen such that the light responsive element is turned on only when the light pen is pressed to the display. Such an improvement eliminates the possibility of a false reading generated by ambient light impinging on the light responsive element.

More recently, the light responsive element has been located remotely from the light pen to eliminate electrical noise inherent in electrically conductive elements extending from a light pen to a processing station. To this end, an optical link between the light pen and the light responsive element has been incorporated into some light pens as disclosed in U.S. Pat. No. 4,109,146 issued to Hillman.

One disadvantage of such prior art light pens is that they employ a glass or plastic optical element through which light from a lighted display is focused onto the light transmissive medium when the tip of a light pen is pressed to the lighted display. Although such operation allows a light pen user to select a particular lighted display location, it does not allow a light pen user to "browse" through a series or matrix of locations on the lighted display. Thus, there is no way to verify that a correct selection has been made prior to the actual selection. This is a particular disadvantage in the case of electronic gaming equipment where a game player might wish to look at several possible choices before making a final selection. Prior art light pens do not allow the game user this opportunity.

In the gaming environment light pens are subjected to considerable abuse. It is not uncommon for light pens to be placed in ashtrays full of cigarettes or to be left dangling in glasses along with ice cubes and partially consumed drinks. Although the inclusion of a light conductive fibre link between the pen the processing station eliminates the possibility of electrical malfunctions due to such rough treatment, prior art pens of necessity incorporate fragile optical elements. The optical elements or lenses significantly increase production costs of the light pen, make maintenance of a faulty or damaged light pen much more difficult, and are quite delicate and easily broken. In the gaming environment, where light pens are often dashed with the gamesters hope of winning a big jackpot, a glass or plastic lens does not last long.

SUMMARY OF THE INVENTION

Generally speaking, the present invention is directed to a light pen wherein a light conductive fibre cable provides an optical link between a lighted display and a light information processing station. Such devices are useful for selecting or locating images on the lighted display. The light pen includes a sleeve axially movable within an elongate barrel between an extended position and a retracted position. The sleeve includes a pin-hole objective formed therein such that pressing the point of the pen to a lighted display moves the sleeve to its retracted position and focuses light present at the selected display location onto a light conductive fibre cable within the pen. Light so focused is propagated along the fibre cable to a processing station to produce electrical signals. The pen includes a spring biasing means for urging the tip into its extended position.

A further aspect of the invention provides a magnet-operated switch for the pen. A magnet is mounted to the pen sleeve such that pressing a sleeve tip to a lighted display moves the sleeve-mounted magnet proximal to the magnet-operated device, thereby actuating the device.

BRIEF DESCRIPTION OF THE DRAWINGS

The present invention is best understood by referring to the specification and drawings, in which.

DETAILED DESCRIPTION OF A PREFERRED EMBODIMENT

Figure 1:
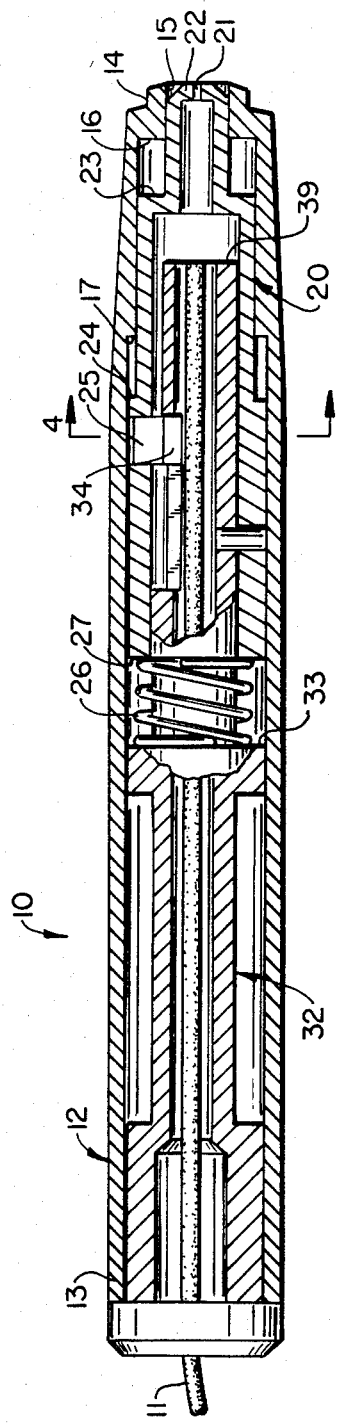
FIG. 1 is a sectional side view of a light pen assembly according to the present invention.

The present invention is a light pen that provides a light transmissive path between a lighted display, such as a CRT or a plasma panel, and a processing circuit. The light pen is typically used to locate or select information displayed on the lighted display.

According to the present invention, a light pen 10 (FIG. 1) includes an elongate barrel 12 having a hollow interior and including a base portion 13 and a tip portion 14. A sleeve 20 (FIG. 2) is axially movable within the hollow interior of barrel 12. The sleeve has a tip portion 22 that is axially movable through a barrel aperture 15. The axially outward extent of sleeve tip 22 through barrel aperture 15 at barrel tip 14 is limited by abutment of a sleeve shoulder surface 23 with a barrel tip retaining shoulder 16, and by abutment of a sleeve abutment surface shoulder 24 with a barrel tip abutment surface 17.

Figure 3:
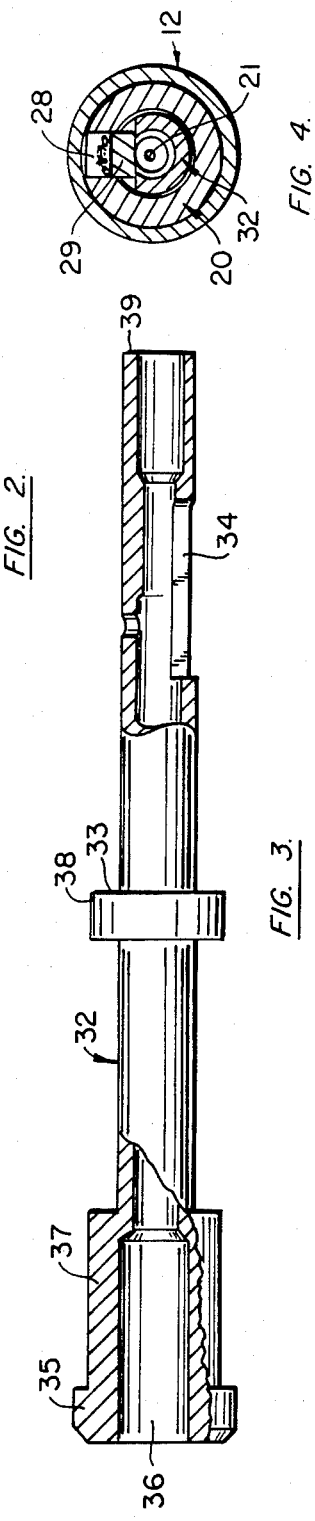
FIG. 3 is a partially sectioned side view of a light pen core element according to the present invention.

A core element 32 (FIG. 3), in the form of a hollow elongate shaft, extends within the hollow portion of barrel 12 and within a hollow portion of sleeve 20. Near barrel tip 14, sleeve 20 and core element 32 are concentric. Core element 32 includes a cap portion 35 that abuts the outer portion of barrel base 13 and by which core element 32 may be secured to the barrel 12. To this end, the cap may be threaded to the barrel, it may be glued to the barrel, or it may be secured thereto by any other such means.

Core element 32 is securely positioned within the hollow portion of the barrel by core locating surfaces 37 and 38. An end of a light conductive fibre cable 11 extends through a hollow core inner surface to a core tip 39. The fibre cable is secured within the core element and extends outwardly from the pen at core cap portion 35 to a processing circuit 41.

Figure 2:
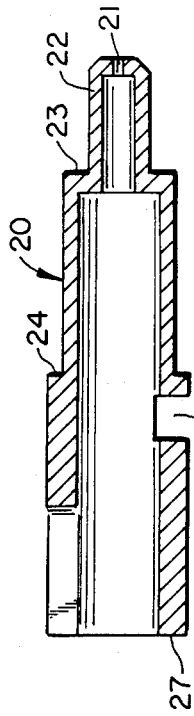
FIG. 2 is a sectional side view of a light pen sleeve according to the present invention.
Figure 4:
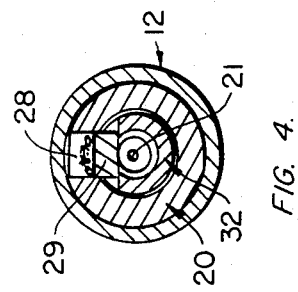
FIG. 4 is a sectional view of the light pen taken along line 4—4 in FIG. 1.

Sleeve 20 is axially slidable within barrel 12. The sleeve is normally biased to an extended position (not shown) wherein sleeve tip 22 projects outwardly from barrel tip 14. Biasing is supplied by spring 26 which pushes against sleeve 20 at spring abutment surface 27. Spring 26 is maintained in position within the barrel's hollow inner surface by core spring retainer surface 33. Although a coil spring is shown in FIG. 1, other biasing means may be substituted therefor.

Sleeve 20 includes a slot 25 in which magnet 28 is mounted. Core assembly 32 includes a slot 34 in which a magnet-actuated switch 29, such as a Hall Effect device, is mounted. Switch leads (not shown) are run along light conductive cable 11 and from the pen through core assembly cap portion 35. In other embodiments of the invention, magnet 28 may be mounted in slot 34 and magnet-actuated switch 29 may be mounted in slot 25.

In operation, light pen 10 is held in a user's hand. Sleeve tip 22 is pressed to a lighted display at a desired location to retract the tip. Such pressing forces sleeve 20 into the hollow inner barrel surface, compressing spring 26. While in the retracted position, light present on the lighted display and entering the pen through pin-hole objective 21 in sleeve tip 22 is focused onto light conductive fibre 11 at core tip 39. Light so focused is propagated along the light conductive cable and routed to a processing circuit 41. The use of a pin-hole objective solves the previously mentioned problems associated with glass or plastic lenses—cost of manufacture, maintenance, and ease of damage.

When the sleeve is in the retracted position, a magnet 28 located along sleeve 20 in slot 25 is moved in proximity to magnet-actuated switch 29, thereby operating the switch. In one embodiment of the present invention, magnet-actuated switch 29 is operated when light entering the pen through pin-hole objective 21 is focused on light conductive fibre 11. Thus, the magnet-actuated switch provides a cueing signal to turn on the light processing circuitry.

In another embodiment of the invention, sleeve 20 may be provided with two possible retracted positions. In this embodiment, a first retracted position focuses light from an image on the lighted display through pin-hole objective 21 onto light conductive fibre 11. In a second retracted position, wherein sleeve tip 22 is more fully pressed into the barrel hollow portion, light from the lighted display is still focused through pin-hole objective 21 onto the light conductive fibre 11. However, in this position, the magnet is now brought in proximity to the magnet-actuated switch, thereby operating the switch. By this means, the lighted display may be scanned or "browsed" by the light pen when the tip is retracted to the first position. An item located on the lighted display may be selected when the tip is retracted to the second position.

Figure 5:
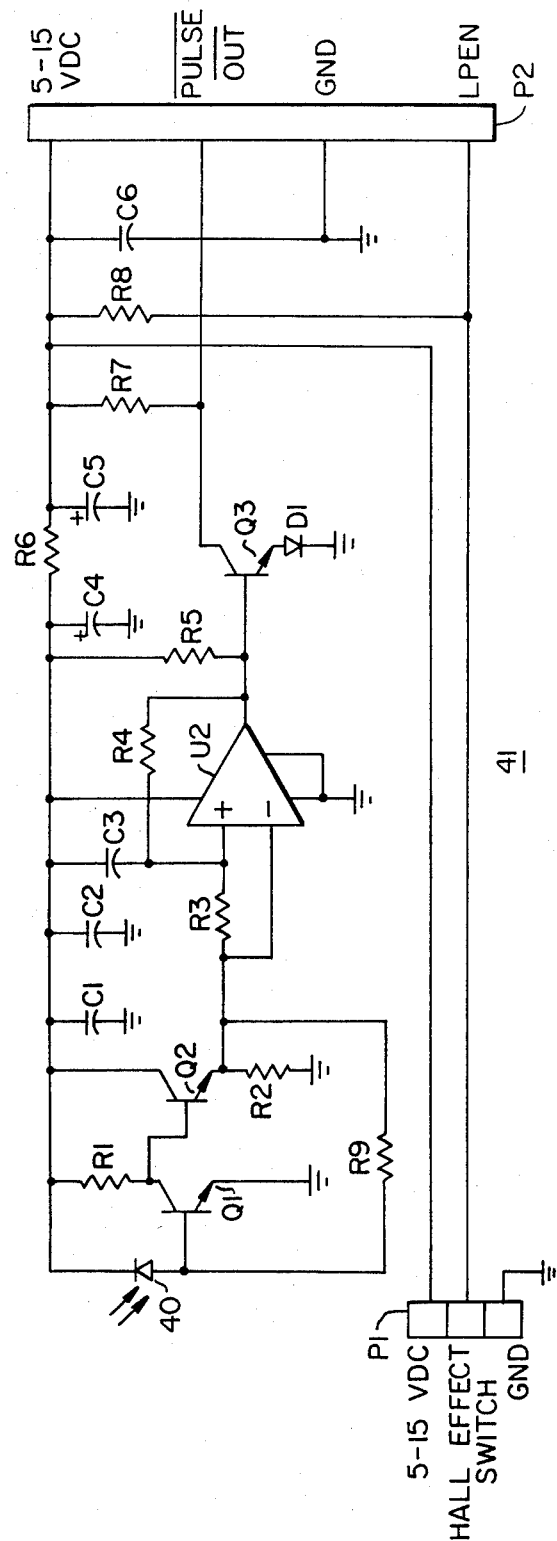
FIG. 5 is a schematic of a processing circuit according to the present invention.

Light information propagated along light conductive fibre cable 11 is coupled to a processing circuit 41 (FIG. 5). The light from the light conductive fibre cable is supplied to a photodetector diode 40. Other light detection devices and accompanying circuitry may be substituted in other embodiments of the invention.

When light is detected by photodetector 40, transistor Q1 changes state. In turn, transistor Q2 changes state. The change of state is sensed by comparator circuit U2/R3/R4/C3. Upon detecting a change of state at transistor Q2, the comparator circuit sends a pulse to the base of transistor Q3, causing Q3 to conduct and thereby generate an output pulse. The output pulse may be coupled to additional circuitry for decoding the location of the image selected on the display.

Leads from Hall Effect Device 29 are routed to connector P1 and then to connector P2. Signals produced by the Hall Effect Device are routed from processing circuit 41 to additional decoding and processing circuitry (not shown) to indicate a cued or selected display position.

While the present invention has been particularly taught and described with reference to the preferred embodiments, those versed in the art will appreciate that minor modifications in form and detail may be made without departing from the spirit and scope of the invention. Accordingly, all such modifications are embodied within the scope of this patent as properly come within our contribution to the art and are particularly pointed out by the following claims.

What is claimed is:

1. A light pen, comprising:
    an elongate barrel having a tip portion and a base portion, said base portion adapted to secure a light conductive fibre cable end segment thereto, said barrel adapted to receive said light conductive fibre cable therein:
    a sleeve positioned at the tip portion of said barrel and axially movable relative thereto between extended and retracted positions;
    a pin-hole objective formed within said sleeve for focusing light onto said light conductive fibre cable end when the sleeve is in its retracted position; and
    means for urging said sleeve to the extended position wherein said sleeve projects axially outward from the tip portion of said barrel, whereby said sleeve may be pressed to the retracted position axially inward from the tip portion of said barrel to focus light present at said pinhole objective onto said light conductive fibre cable end.

2. A light pen, comprising:
    an elongate barrel having a tip portion and a base portion;
    a sleeve positioned at the tip portion of said barrel and axially movable relative thereto;
    a pin-hole objective formed within said sleeve;
    a light conductive fibre cable having a first end segment secured to the base portion of said barrel and positioned within said barrel for receiving light focused thereon by said pinhole objective when the sleeve is at a predetermined axial position; and
    means urging said sleeve to an extended position wherein said sleeve projects axially outward from the tip portion of said barrel and permitting movement of said sleeve to the predetermined position axially inward from the tip portion of said barrel to focus light present at said pin-hole objective onto said first light conductive fibre cable end.

3. The light pen of claim 2, further comprising:
    a magnet secured to said sleeve and axially movable therewith between said sleeve extended position and said sleeve retracted position; and a magnet-actuated switch positioned within said barrel and secured therein, said switch responding to a field produced by said magnet when said magnet is moved in proximity to said switch as said sleeve is moved to its retracted position.

4. The light pen of claim 2, further comprising:
a magnet positioned within said barrel and secured therein; and
a magnet-actuated switch secured to said sleeve and axially movable therewith between said sleeve extended position and said sleeve retracted position, said switch responding to a field produced by said magnet when said switch is moved in proximity to said magnet as said sleeve is moved to its retracted position.

5. The light pen of claims 3 or 4, wherein said magnetactuated switch further comprises a Hall Effect device.

6. The light pen of claim 2, further comprising;
said fibre light conductive cable extending from said barrel and having a second end segment; and
processing means to which said second light fibre conductive cable end segment is secured for receiving light information propagated along said light conductive fibre cable and for converting said light information into electric pulses.

7. A light pen, comprising:
an elongate barrel having a tip portion and a base portion;
a light conductive fibre cable having a first end segment secured to a base portion of said barrel and positioned within said barrel, said light conductive fibre cable extending from said barrel to a second end segment;

a sleeve positioned at a tip portion of said barrel and axially movable relative thereto;
a pin-hole objective formed within said sleeve;
spring means urging said sleeve to an extended position wherein said sleeve projects axially outward from the tip portion of said barrel, such that light present at said pin-hole objective is not focused onto said first light conductive fibre cable end, and wherein said sleeve may be pressed to a retracted position axially inward from the tip portion of said barrel, such that light present at said pin-hole objective is focused onto said first light conductive fibre cable end;
a magnet secured to said sleeve and axially movable therewith between said sleeve extended position and said sleeve retracted position; and
a Hall Effect device positioned within said barrel and secured therein, said device responding to a field produced by said magnet when said magnet is moved in proximity to said Hall effect device as said sleeve is moved to its retracted position.

8. The light pen of claim 7, wherein said barrel further comprises means for limiting the extent to which said sleeve is axially movable outward from the tip portion of said barrel.

9. The light pen of claim 7, further comprising:
processing means to which said second light conductive fibre cable end segment is secured for receiving light information propagated along said light conductive fibre cable and including:
(a) light responsive means coupled to said second light conductive fibre cable end segment; and
(b) amplifier means coupled to said light responsive means for producing an electric pulse in response to light actuation of said light responsive device.

* * * * *